United States Patent Office 3,326,819
Patented June 20, 1967

3,326,819
CATALYTIC COMPOSITIONS COMPRISING ANTIMONY OXIDE, TIN OXIDE AND A PROMOTER
Frank Christopher Newman, Great Bookham, England, assignor to The Distillers Company Limited, Edinburgh, Scotland, a British company
No Drawing. Filed Nov. 19, 1965, Ser. No. 508,831
4 Claims. (Cl. 252—461)

This invention relates to the hardening of catalytic compositions, and in particular to the hardening of catalyst compositions containing antimony and tin for use in organic oxidation and dehydrogenation reactions, and is a continuation-in-part of application Ser. No. 174,688 filed Feb. 21, 1962, now abandoned.

Processes for the production of acrolein and methacrolein by the vapour phase catalytic oxidation of propylene and isobutene and processes for the production of acrylonitrile and methacrylonitrile by the catalytic vapour phase reactions of propylene or acrolein, or isobutene or methacrolein, in the presence of a catalyst selected from the group consisting of (i) a mixture of the oxides of antimony and tin (ii) a compound containing antimony, tin and oxygen are described in U.S. Patents 3,152,170; 3,094,565, and 3,094,552. A particularly preferred catalyts for those reactions comprises antimony tetroxide in combination or in admixture with stannic oxide.

In carrying out reactions of the above type on an industrial scale with pelleted catalysts particularly in a fluidised bed system it is essential that the pellets should be physically robust. If the granules are soft and easily reduced to dusts and fines, this causes blockages and unequal flow of the gaseous reactants through the reactor tubes or beds. Rapid attrition is particularly noticeable with catalysts which have been subjected to a preheat treatment above 900° C. which renders them soft.

It has now been found that the catalytic properties of such catalysts are promoted by the incorporation of a compound additive of calcium or barium or a metal having an atomic number in the range 22 to 28 inclusive in amount up to 25% on a molar basis of the total mixture.

The metallic compound additives promoted are thus those of calcium, barium, tritanium, vanadium, chromium, iron, manganese, cobalt or nickel, either singly or in admixture. The use of oxides, sulphates, or compounds forming oxides at the reaction temperatures employed, e.g., nitrates are preferred.

The catalytic composition itself may be regarded either as a mixture of antimony tetroxide with stannic oxide or as a compound of antimony, tin and oxygen; under the reaction conditions either or both forms may be present in the catalyst. The catalytic composition may be prepared from any of the oxides of antimony and tin, or from compounds of tin or antimony which on heating in the presence of an oxygen-containing gas, such as air, are converted to the oxides provided the final composition contains antimony tetroxide and stannic oxide. Oxides of antimony and tin, or substances yielding these oxides, which may be used in the manufacture of the catalytic composition include antimony trioxide, antimony tetroxide, antimony pentoxide or mixtures of such oxides; stannic oxide, stannous oxide, or mixtures of such oxides. Hydrated forms of these oxides may also be used, for instance such as are formed by the action of aqueous nitric acid on antimony or tin metals or on mixtures of the metals. The catalyst may be prepared for instance by mixing together any of the oxides of antimony and tin, or substances yielding these oxides, and subjecting the mixture to a heat-treatment in the presence of an oxygen-containing gas such as air, for instance at a temperature between 550° and 1100° C. Where the initial components are antimony tetroxide and stannic oxide themselves, it is still preferred to subject the mixture to a prior heat-treatment with or without oxygen for instance at a temperature between 550° and 1100° C.

A particularly preferred method of preparing the antimony oxide/tin oxide catalytic composition comprises intimately mixing stannic oxide or the hydrated oxide obtained by the action of aqueous nitric acid on tin metal, with antimony pentoxide, antimony tetroxide or the hydrated oxide formed by the action of aqueous nitric acid on antimony metal, and heat-treating the resulting mixture at 550° to 1100° C. in the presence of an oxygen-containing gas such as air.

Another preferred method of preparing the antimony oxide/tin oxide catalytic composition comprises hydrolysing with water cationic salts of the metals, such as the chlorides, and recovering and heating the resulting precipitate. To obtain complete hydrolysis it may be necessary to add a volatile base such as ammonia. Either or both of the metal oxide components of the composition may be prepared in this way. Particularly useful catalytic compositions can be prepared by this method from stannic chloride and antimony pentachloride by mixing them together in aqueous media and adding ammonia until the pH is greater than 5.0, recovering the precipitate and heating it at a temperature between 550° and 1100° C.

When the tin and antimony compounds in the mixture are present in the lower valency state, i.e., as divalent tin or trivalent antimony compounds, it is particularly preferred to subject the mixture to a preliminary heat-treatment in an atmosphere comprising oxygen and an inert gas such as nitrogen, carbon dioxide or steam, the temperature being controlled so that no part of the catalyst during this preliminary heat-treatment exceeds a temperature of about 650° C.; in this way loss of the lower valent metallic compounds by volatilisation is avoided. A convenient way of doing this is to heat pellets of the catalyst in a furnace, the temperature of which is raised from about 300° to about 650° C., over a period of not less than about 8 hours, while passing a stream of air over the catalyst. After this preliminary heat-treatment, the mixture is then subjected to a final heat-treatment in air at a temperature in the range 550° to 1100° C.

The atomic ratio of tin or antimony in the catalytic composition may vary within moderately wide limits, for instance between 0.1:1 and 20:1, although compositions containing proportions of tin to antimony outside this range may be useful for some purposes.

By whichever method the oxides or hydrated oxides have been prepared the mechanical stability of the finished catalyst is enhanced by washing, preferably with water before drying.

The metal compound additive may be added in any suitable manner to the catalyst composition and at any time but preferably during the preparation of the catalyst, and before the final drying thereof. Preferably the addition is made by slurrying the filter cake, produced after filtering and washing the catalyst mixture, with a solution or slurry of the metal compound additive and subsequently drying, and if desired, pelleting the resultant mixture. The addition of metal compound additives to the catalyst composition in the form of slurries of insoluble salts, e.g., calcium sulphate, or in the form of gels, e.g., that of titanium oxide, is particularly useful.

The proportions of promoter incorporated in the catalyst composition may vary up to about 25% on a molar basis according to the catalytic properties of the catalyst desired. Generally, incorporation of about 2% to about 10% on a molar basis of the promoter is sufficient.

Further it has been found that the incorporation of metallic compound additives in accordance with the invention exhibits particular advantage in catalyst compositions which are to be preheated to temperatures above about 900° C.

In operation the catalyst may be employed in a fixed bed in the form of granules or pellets or in a fluidised or moving bed.

Reactions in which tin/antimony catalyst promoter composition is of particular value include the oxidation of propylene to acrolein and/or acrylic acid, the oxidation of acrolein to acrylic acid, the oxidation of isobutene to methacrolein and/or methacrylic acid, the oxidation of methacrolein to acrylic acid, the oxidative dehydrogenation of butene to butadiene in the presence of molecular oxygen, the oxidative dehydrogenation of methylbutene to isoprene in the presence of molecular oxygen, the conversion of propylene to acrylonitrile and of isobutene to methacrylonitrile in the presence of ammonia and molecular oxygen, and the conversion of methanol to hydrogen cyanide also in the presence of ammonia and molecular oxygen.

The manufacture and use of the catalyst of the present invention is further illustrated (but in no way limited) by the following examples.

In the examples the parts by weight and parts by volume hear the same relation to each other as do kilograms to litres.

*Examples 1–3*

These examples relate to the oxidation of propylene to acrolein using tin/antimony catalysts having an atomic ratio of tin to antimony of 2:1, and prepared as follows:

Powdered tin (190 parts by weight) was added in small portions to a boiling solution of nitric acid (800 parts by volume of concentrated nitric acid of density 1.42 g./ml. in 3,200 parts by weight of water). Powdered antimony (97.6 parts by weight) was added in small portions to warm concentrated nitric acid (400 parts by volume). Both mixtures were boiled until no further brown nitrous fumes were evolved. While still hot the antimony oxide suspension was added to the tin mixture with stirring. The resulting mixture was washed by decantation and filtered. A 2 molar percent solution or slurry of the desired metal compound additive was added to and well mixed with the filter cake and the resulting mixture dried. The mixture was sieved to give granules of less than 30 mesh B.S.S., pelleted and heated in air at 725° C., for 16 hours and then at 950–1,000° C. for 16 hours.

The catalyst was placed in a reactor and maintained at the various temperatures indicated below whilst being contacted with a gaseous feed stream consisting of, by volume, 10% propylene, 40% water vapour and 50% air.

As the basis for comparison the process of the above examples was repeated using a tin/antimony catalyst prepared as described above but without the addition of the metal compound additive as promoter.

TABLE 1

| Example | Temperature of final heat treatment, °C. | Additive | Attrition rate, percent | Reaction temperature, °C. | Yield of acrolein based on propylene fed | Yield of acrolein based on propylene consumed (Efficiency) |
|---|---|---|---|---|---|---|
| 1 | 950 | 2% molar calcium sulphate. | 3.2 | 486 | 37.6 | 68 |
| 2 | 1,000 | ----do---- | 4.9 | 484 | 36.8 | 72 |
| 3 | 950 | 2% molar ferric nitrate. | 3.3 | 488 | 37.0 | 68 |
| Comparison test. | 1,000 | | 63 | 527 | 35.7 | 66 |

In the above table the "attrition rate percent" relates to the percentage weight of the original pellets, which as fines will pass a 16 mesh B.S.S., after a crushing and grinding test in which a 10 gm. sample of pellets is placed in a 2 oz. bottle together with a stainless steel rod (3.5 cm. long x 1.27 cm. diameter) weighing 3.4 g., and rotating the bottle and its contents about its axis at 160 r.p.m. for 5 minutes. The inclusion of this data indicates a further effect of the metal compound additives used as promoters namely a mechanical hardening of the tin/antimony catalysts.

*Examples 4–6*

These examples relate to the preparation of acrylonitrile. The catalyst compositions were prepared in a manner similar to that described above for Examples 1–3. The catalyst was placed in a reactor as before and contacted at various temperatures with a gaseous feed stream consisting of, by volume, 5% propylene, 6% ammonia, 34% water vapour and 55% air.

As before a comparison test was carried out using a tin/antimony catalyst without promoter in a manner similar to that used for the catalysts containing promoter.

TABLE 2

| Example | Temperature of final heat treatment, °C. | Additive | Attrition rate, percent | Reaction temperature, °C. | Yield of acrylonitrile based on propylene fed | Yield of acrylonitrile based on propylene consumed (Efficiency) |
|---|---|---|---|---|---|---|
| 4 | 950 | 2% molar titanium dioxide. | 3.7 | 503 / 518 | 53.5 / 55.3 | 64 / 64 |
| 5 | 1,000 | 2% molar vanadium dioxide. | 4.1 | 490 | 55.5 | 63 |
| 6 | 950 | 2% molar ferric nitrate. | 3.3 | 525 | 56.2 | 64 |
| Comparison test. | 1,000 | | 63 | 506 | 50.0 | 63 |

*Examples 7–11*

These examples relate to the preparation of hydrogen cyanide from methanol.

The catalyst compositions used in Examples 7–11 (Table 3) were prepared in a manner similar to that described above for Examples 1–3.

The catalyst was placed in a reactor and maintained at the various temperatures indicated below whilst being contacted with a gaseous feed stream consisting of, by volume, 5% methanol, 6% ammonia, 34% water vapour and 55% air.

As before, comparison tests were carried out using catalysts without promoter in a manner similar to that used for the catalysts containing promoter.

TABLE 3

| Example | Temperature of final heat treatment, °C. | Additive | Attrition rate, percent | Reaction temperature, °C. | Yield of HCN based on methanol fed | Yield of HCN based on the methanol consumed (Efficiency) |
|---|---|---|---|---|---|---|
| 7 | 1,000 | 10% molar titanium dioxide. | 1.3 | 485 | 74.3 | 80 |
| 8 | 1,000 | 5% molar titanium dioxide. | 3.0 | 474 | 75.3 | 75 |
| 9 | 1,000 | 2% molar titanium dioxide. | 3.4 | 464 | 79.3 | 80 |
| 10 | 1,000 | 2% molar barium nitrate. | 2.5 | 460 | 75.9 | 76 |
| 11 | 1,000 | 10 molar calcium nitrate. | 1.4 | 470 | 79.5 | 80 |
| Comparison test. | 1,000 | --- | 24 | 480 | 73 | 74 |

Example 12

A catalyst containing antimony, tin and vanadium oxides in the atomic ratios Sb:Sn:V of 16:4:1 was prepared as follows:

To a stirred mixture of concentrated nitric acid (d. 1.42, 234 parts by weight) and water (300 parts by weight) at 98–100° C. were successively added, (1) powdered tin (39.5 parts by weight), (2) concentrated nitric acid (1000 parts by weight) and (3) powdered antimony (160 parts by weight).

The metal powders were each introduced over a period of 30–40 minutes. The mixture was stirred for an hour, cooled to 40°, filtered and the cake washed by resuspension in water (700 parts by weight). The washed filter-cake was added to a solution of vanadium pentoxide (7.6 parts by weight) in a mixture of concentrated hydrochloric acid (25 parts by weight), water (25 parts by weight) and ethanol (5 parts by weight), and the mixture brought to pH 6.7 by the addition of ammonia.

The precipitate was filtered, washed, dried at 100°, and the dry cake comminuted, mixed with graphite (2.4 parts by weight) and pelleted. The pellets were heated in air at 20° C. per hour to 900° C., and maintained at this temperature for 16 hours.

From a feed of 10% propylene, 60% air and 30% steam, passed over this catalyst at 385° C. and 4 seconds contact time, the yields per pass, based on propylene fed were: acrolein 15%, acrylic acid 9% and carbon oxides 11%. Of the propylene fed 56% was recovered.

Example 13

A catalyst prepared as in Example 1, but with an atomic ratio of antimony:tin:vanadium of 8:2:1, and heat-treated at 800° C. gave the following yields under the conditions of Example 1: acrolein 25%, acrylic acid 15%, carbon oxides 17%. The propylene recovered amounted to 42%.

Example 14

A catalyst prepared as in Example 1, but with the composition Sb:Sn:V of 4:2:1 and heat-treated at 925° C. gave the following yields at 380° C. and 4 seconds contact time: acrolein 33%, acrylic acid 11%, carbon oxides 8%. The conversion efficiency to acrolein and acrylic acid was 86%.

Example 15

A catalyst prepared as in Example 1, but with the composition Sb:Sn:V of 2:1:1, heat-treated at 875° C. yielded at 420° and 4 seconds contact time, 33% acrolein, 17% acrylic acid and 6% carbon oxides. The conversion efficiency to acrolein and acrylic acid together was 89%.

Example 16

19.8 parts by weight of powdered tin were added to a stirred solution of 118 parts by weight of nitric acid (S. G.=1.42) in 333 parts by weight of water at 95–100° C. Concurrently, 81.2 parts by weight of antimony powder were added to 473 parts of nitric acid (S. G.=1.42) at 95–100° C.

When the additions were completed, the suspensions were heated at their boiling points for 10 minutes and then mixed. The mixture was heated for a further 15 minutes, cooled to below 40° C. and filtered. The filter cake was washed by resuspension in 333 parts by weight of water at room temperature for 15 minutes, filtered, boiled in 333 parts by weight of water for one hour, cooled to below 40° C. and filtered. The filter cake was finally washed by resuspension in 333 parts by weight of water at room temperature for 15 minutes and filtered.

A solution of chromic nitrate $(Cr(NO_3)_3 9H_2O)$ (50 parts by weight) in water (100 parts by weight) was added to a suspension of the washed tin/antimony oxides in water (400 parts by weight) and the mixture stirred for 15 minutes. The pH of the mixture was adjusted to 7 by the dropwise addition of 8 N ammonia. The green precipitate was filtered off, washed by re-suspension in water (500 parts by weight) for 15 minutes, filtered and dried at 110° C. for 16 hours. The dried powder was pelleted in admixture with 1% graphite and the pellets heated at 800° C. for 16 hours in a stream of air; the temperature of the furnace being raised from 300° C. to 800° C. at 20° C. per hour.

A mixture by volume, 5% propylene, 6% ammonia, 55% air and 34% steam pas passed over a bed of the catalyst in a reactor at 480° C. The contact time was 4 seconds.

Of the propylene fed to the reactor, 62.7% was converted to acrylonitrile, 13.4% to carbon dioxide and 5% was recovered.

Example 17

Tin powder (59.4 parts by weight) was added slowly to a stirred solution of concentrated nitric acid (355 parts by weight) and water (500 parts by weight) at 90° C. Concentrated nitric acid (1400 parts by weight) was added, the temperature raised to 95° C. and antimony powder (243.5 parts by weight) added slowly. The mixture was stirred at 100° C. for a further 15 minutes, cooled to 40° C. and filtered.

The filter cake was washed by resuspension in water (2000 parts by weight) for 15 minutes, filtered, resuspended in boiling water (2000 parts by weight) for 1 hour, filtered and finally resuspended in water (2000 parts by weight) for 15 minutes and filtered.

The filter cake was resuspended in water (450 parts by weight), a solution of manganous chloride, $$MnCl_2 \cdot 4H_2O$$

(49.4 parts by weight) in water (50 parts by weight) added and the mixture stirred for 15 minutes. Aqueous ammonia, consisting of a mixture of equal volumes of aqueous ammonia (density 0.880) and water, was added until the pH of the mixture reached 10.4.

The suspension was filtered and the filter cake was washed twice by resuspension in portions of water (1000 parts by weight) for 15 minute periods. The material was dried at 110° C. ground to <30 mesh, mixed with 1% w./w. graphite and pelleted (3 mm). The pellets were heated to 850° C. in a stream of air; the temperature was raised at the rate of 21° C. per hour and then maintained at 850° C. for 16 hours.

A gaseous feed of 5% v./v. propylene, 6% v./v. ammonia, 34% v./v. steam and 55% v./v. air was fed over this catalyst at 480° C. and 4 seconds contact time. The yields of acrylonitrile, acrolein and carbon dioxide, based on the propylene fed, were 60%, 2% and 10%, respectively. The efficiency of conversion of propylene to acrylonitrile was 66%.

I claim:

1. A catalytic composition for use in the vapour phase oxidation of organic hydrocarbons consisting essentially of a composition selected from the group consisting of (i) mixtures of antimony and tin oxides, and (ii) a compound containing antimony, tin and oxygen, and a promoter which is an oxide of a metal selected from the group consisting of calcium, barium and, a metal having an atomic number of from 22 to 28 inclusive, such promoter being present in an amount up to 25% on a molar basis of the total mixture, the atomic ratio of tin to antimony in said composition being from 0.1:1–20:1.

2. A catalytic composition as claimed in claim 1, wherein the amount of promoter is in the range about 2% to about 10% on a molar basis of the total mixture.

3. A catalytic composition for use in the vapour phase oxidation of organic hydrocarbons consisting essentially of a composition selected from the group consisting of (i) mixtures of antimony and tin oxides, and (ii) a compound containing antimony, tin and oxygen, and a promotor which is an oxide of a metal selected from the group consisting of titanium, vanadium, calcium, barium, and iron, such promoter being present in an amount up to 25% on a molar basis of the total mixture, the atomic ratio of tin to antimony in said composition being from 0.1:1–20:1.

4. A catalytic composition for the use in the vapour phase oxidation of organic hydrocarbons consisting essentially of a mixture of antimony tetroxide and stannic oxide and a promoter which is an oxide of a metal selected from the group consisting of calcium, barium and, a metal having an atomic number of from 22 to 28 inclusive, such promoter being present in an amount up to 25% on a molar basis of the total mixture, the atomic ratio of tin to antimony in said composition being from 0.1:1–20:1.

References Cited

UNITED STATES PATENTS

| | | | |
|---|---|---|---|
| 2,481,826 | 9/1949 | Cosby | 260—465.3 |
| 2,520,181 | 8/1950 | Teter et al. | 260—465.3 |
| 3,009,943 | 11/1961 | Hadley et al. | 260—465.3 |
| 3,135,783 | 6/1964 | Sennewald | 260—465.3 |
| 3,152,170 | 10/1964 | Barclay et al. | 252—461 X |
| 3,198,751 | 8/1965 | Bethell et al | 252—461 |

OSCAR R. VERTIZ, *Primary Examiner.*

G. T. OZAKI, *Assistant Examiner.*